(12) United States Patent
Morishita

(10) Patent No.: US 8,079,454 B2
(45) Date of Patent: Dec. 20, 2011

(54) FRICTION ENGAGEMENT APPARATUS

(75) Inventor: Hirofumi Morishita, Seto (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 147 days.

(21) Appl. No.: 12/574,216

(22) Filed: Oct. 6, 2009

(65) Prior Publication Data

US 2010/0084241 A1 Apr. 8, 2010

(30) Foreign Application Priority Data

Oct. 8, 2008 (JP) ................................. 2008-261757

(51) Int. Cl.
*F16D 25/0638* (2006.01)
(52) U.S. Cl. .................................. 192/85.39; 192/85.45
(58) Field of Classification Search ............... 192/85.39, 192/85.45; 475/146; 267/161, 163
See application file for complete search history.

(56) References Cited

U.S. PATENT DOCUMENTS

| 3,848,518 A * | 11/1974 | Martin ............................. 92/107 |
| 6,786,843 B2 | 9/2004 | Mizuno |
| 7,107,867 B2 * | 9/2006 | Miyazaki et al. ............... 74/333 |
| 7,513,351 B2 | 4/2009 | Onishi et al. |
| 2010/0032260 A1 * | 2/2010 | Harashima et al. ........... 192/221 |

FOREIGN PATENT DOCUMENTS

| JP | S56149143 | 4/1980 |
| JP | S60-138039 U1 | 9/1985 |
| JP | S61-023537 U1 | 2/1986 |
| JP | 05033835 A | 2/1993 |
| JP | 11280791 A | 10/1999 |
| JP | 2000081118 A | 3/2000 |
| JP | 2002-206598 A | 4/2002 |
| JP | 2003106427 A | 4/2003 |
| JP | 2004-156757 A | 6/2004 |
| JP | 2006144879 A | 6/2006 |
| JP | 2007-170440 A | 7/2007 |
| JP | 2007-170442 A | 7/2007 |
| JP | 2008038945 | 2/2008 |
| WO | WO 2008132586 A2 * | 11/2008 |

OTHER PUBLICATIONS

Office Action from Japanese application No. 2008-261757 dated Dec. 7, 2010 with declaration; 6 pages.

* cited by examiner

*Primary Examiner* — Richard M. Lorence
(74) *Attorney, Agent, or Firm* — Gifford, Krass, Sprinkle, Anderson & Citkowski, P.C.

(57) ABSTRACT

The friction engagement apparatus comprises a case forming part of a power transmission apparatus, a plurality of friction plates splined to the case, a plurality of friction plates splined to a rotation element, an annular piston having a cylindrical wall portion imparting the urging pressure to the friction plates, an urging device having a return spring intervening between the case and the piston to urge the piston in one axial direction, the cylindrical wall portion having a first pressure receiving section formed with a cut-off recession, and a second pressure receiving section formed with no cut-off recession, and the return spring being coaxially arranged with the piston and having a bending stiffness in the axial direction with respect to a circumferential unit length, the bending stiffness in the first pressure receiving section being larger than the bending stiffness in the second pressure receiving section.

7 Claims, 5 Drawing Sheets

FRICTION ENGAGEMENT APPARATUS

FIELD OF THE INVENTION

The present invention relates to a friction engagement apparatus assembled with a power transmission apparatus used for an automotive vehicle, and more particularly to a friction engagement apparatus provided with a piston partly cut-off therein to extend in the pressure imparting direction for the purpose of preventing the piston from interfering with other elements and parts in the power transmission apparatus.

BACKGROUND OF THE INVENTION

In the power transmission apparatus used for the automotive vehicle, such as for example an automatic transmission apparatus comprises a plurality of planetary gear sets constituting a transmission mechanism and each having a plurality of elements such as a ring gear, a planetary carrier, a sun gear, and a friction engagement apparatus of wet multi-plates type serving as a clutch or a brake. The friction engagement apparatus is operated to have the above elements selectively engaged with and disengaged from each other and a stationary case, thereby changing a power transmission path with a plurality of change stages.

In general, the automatic transmission apparatus is shown in FIG. 5 and comprises a transmission mechanism 100 having a plurality of rotation elements 101 to 103 disposed in parallel relationship with each other. In order to make the transmission mechanism 100 small in size, the distances between the rotation shafts of the rotation elements 101 to 103 are required to be reduced to a level as small as possible.

To meet the above requirement, there has been proposed one of the conventional friction engagement apparatus disclosed in the Patent Document 1 and comprising a transmission case 104, a counter drive gear rotatably supported on the transmission case 104 for outputting a power to the other elements from the transmission mechanism, and a piston forming part of a friction brake apparatus and formed roughly in a cylindrical shape surrounding the most part of the counter drive gear. The piston is formed with a cut-off recession cut off to extend in its axial direction for allowing the counter drive gear to partly be received in the cut-off recession to ensure that the counter drive gear is held in mesh with a counter driven gear for outputting the power. The counter driven gear is also partly surrounded by the piston and partly received in the cut-off recession. The piston of the conventional automatic transmission apparatus is produced by a press working to have a bottom and a thin thickness so that the piston can have a relatively high mechanical strength. The piston is operated with a return spring in the form of a plate spring to ensure that the axial length of the friction engagement apparatus is shortened.

Another conventional friction engagement apparatus is disclosed in the Patent Document 2 and comprises a snap ring formed in a C-shape and having an opening along the periphery thereof in the neighborhood of friction plates. The snap ring is arranged with respect to a pair of power transmission gears with the opening held in registry with an opening formed in a case to allow the power transmission gears to be held in mesh with each other through the opening of the snap ring and the opening of the case so that the distance between the both axes of the power transmission gears can be as small as possible.

Still another conventional friction engagement apparatus is disclosed in the Patent Document 3 to comprise a return spring for resiliently urging a piston to its releasing state to have a brake opened. The apparatus has an annular retainer partly cut-off to have a cut-off recession through which the pressure imparting portion of the piston is projected. The other conventional friction engagement apparatus is disclosed in the Patent Document 4 and comprises a plurality of annular friction plates each functioning as an annular brake plate.

The brake plate has a plurality of external teeth formed on the peripheral portion thereof except for a peripheral portion cut-off with no tooth portion, i.e., a groove receiving therein a set of return springs. Each of the return spring is composed of a compression spring to have the friction engagement apparatus prevented from becoming large in size.

Patent Document 1: Patent Publication No. 2006-144879
Patent Document 2: Patent Publication No. 2000-81118
Patent Document 3: Patent Publication No. 2007-170442
Patent Document 4: Patent Publication No. 2007-170440

However, the urging means in each of the above mentioned conventional friction engagement apparatuses thus constructed is designed to urge the piston toward the piston releasing state, the urging means including a plurality of compression coil springs circumferentially equally spaced apart from one another on the piston, or including a return spring made of a plate spring and having a spring stiffness and a plate bending stiffness both of which are equal at its circumferential positions of the piston.

In the conventional automatic transmission apparatuses, the piston is required to be partly cut-off to have a cut-off recession extending in the axial direction for the purpose of avoiding the counter drive and driven gears and other elements from interfering with one another. However, the piston assembled in the automatic transmission apparatus is imparted a circumferentially equal pressure by the compression coil springs spaced apart from one another on the piston and by the return spring having a spring stiffness and a plate bending stiffness both of which are equal at its circumferential positions of the piston. The circumferentially equal operation fluid pressure exerted on the piston leads to the fact that the cylindrical portion of the piston in the vicinity of the cut-off recession is susceptible to the concentrated stress, thereby making the piston apt to be deformed if the piston is made small in size.

The present invention has been made to solve these problems encountered by the conventional friction engagement apparatus. It is, therefore, an object of the present invention to provide a friction engagement apparatus comprising a piston restrained from unnecessarily deformed even with the cut-off recession formed in the piston to ensure that the piston becomes small in size, thereby making it possible to provide a friction engagement apparatus suitable for the power transmission apparatus also small in size.

SUMMARY OF THE INVENTION

The friction engagement apparatus according to the present invention is made to achieve the above object, and (1) comprises: a first friction plate supported on a ease; a second friction plate supported on a rotation element rotatable with respect to the case; an annular piston slidably accommodated in the case and having a pressure receiving portion forming an annular oil pressure chamber together with the case between the case and the pressure receiving portion and a pressure imparting portion imparting pressure to the first and second friction plates in one axial direction with a thrust force from the pressure receiving portion; and urging means intervening between the case and the piston and having a resilient member for resiliently urging the piston in the other axial direction opposite to the one axial direction; the piston having a first pressure receiving section formed by partly cutting off the pressure receiving portion in the circumferential direction and a second pressure receiving section extending in the circumferential direction to exclude the first pressure receiving section; the urging means being constituted by an annular member coaxially arranged with the annular piston and having a bending stiffness in the one axial direction with respect to a predetermined circumferential length of the annular member, the stiffness in the range of the first pressure receiving section being larger than the stiffness in the range of the second pressure receiving section.

According to the construction of the friction engagement apparatus as defined in the above description, the piston has a first pressure receiving section circumferentially extending in the range of the cut-off recession, and a second pressure receiving section also circumferentially extending in the range excluding the cut-off recession. The second pressure receiving section of the piston receives an oil pressure from an oil chamber and a reaction force opposing to the oil pressure. The first pressure receiving section of the piston receives the oil pressure from the oil chamber but does not receives the reaction force, thereby causing the first pressure receiving section to be inclined to receive a bending force and a concentrated stress. The urging means is constituted by an annular member coaxially arranged with the annular piston and having a bending stiffness in the one axial direction with respect to a predetermined circumferential length of the annular member. The stiffness of the annular member in the range of the first pressure receiving section is larger than the stiffness of the annular member in the range of the second pressure receiving section leads to the fact that the annular member has a high stiffness portion in the range of the first pressure receiving section. The annular member can be reinforced by the high stiffness portion and restrained from excessive strain and concentrated stress.

In the friction engagement apparatus (1) as defined in the above description, (2) the urging means may be constituted by an annular plate spring.

According to the construction of the friction engagement apparatus (2) as defined in the above description, the urging means is constituted by an annular plate spring having a shape changeably set and a bending stiffness in the pressure imparting direction per a predetermined circumferential length. The bending stiffness in the range of the first pressure receiving section can easily be differentiated from the bending stiffness in the range of the second pressure receiving section, thereby resiliently urge the piston to move away from the friction plates, and thereby making it possible to shorten the axial length of the friction engagement apparatus.

In the friction engagement apparatus (2) as defined in the above description, (3) the annular plate spring may have an annular plate portion coaxially arranged with the annular piston and a plurality of warping arm portions radially extending from the annular plate portion, the annular member and the resilient member being constituted by the annular plate portion and the warping arm portions.

According to the construction of the friction engagement apparatus (3) as defined in the above description, at least one of the warping arm portions is differentiated in shape from the other in the ranges of the first and second pressure receiving sections and, thereby making it possible to have the bending stiffness in the range of the first pressure receiving section easily differentiated from the bending stiffness in the range of the second pressure receiving section, and to easily discriminate the high stiffness portion from other low stiffness portion.

In the friction engagement apparatus (3) as defined in the above description, (4) the annular plate portion of the annular plate spring has a first radial width in the range of the first pressure receiving section and a second radial width in the range of the second pressure receiving section, the first radial width being larger than the second radial width.

According to the construction of the friction engagement apparatus (4) as defined in the above description, the annular plate portion of the annular plate spring thus constructed makes it possible to have the bending stiffness in the range of the first pressure receiving section easily differentiated from the bending stiffness in the range of the second pressure receiving section, and to easily discriminate the high stiffness portion from other low stiffness portion.

In the friction engagement apparatus (3) as defined in the above description, (5) the warping arm portions of the annular plate spring have a first circumferential width in the range of the first pressure receiving section and a second circumferential width in the range of the second pressure receiving section, the first circumferential width being larger than the second circumferential width.

According to the construction of the friction engagement apparatus (5) as defined in the above description, the annular plate portion of the annular plate spring thus constructed makes it possible to have the bending stiffness in the range of the first pressure receiving section easily differentiated from the bending stiffness in the range of the second pressure receiving section, and to easily discriminate the high stiffness portion from other low stiffness portion.

In the friction engagement apparatus (1) as defined in the above description, (6) the piston is constituted by a sheet metal member produced by a press working and a seal member attached to the sheet metal member.

According to the construction of the friction engagement apparatus (6) as defined in the above description, the piston can be produced with a thin thickness and at a low cost although the piston is formed in a relatively large diameter annular shape.

In the friction engagement apparatus (6) as defined in the above description, (7) the sheet metal member of the piston has a bottom wall portion serving as the pressure receiving portion and a cylindrical wall portion formed to be bent from the bottom wall portion in the one axial direction, the cylindrical wall portion being cut off in a U-shape from its axial end opposing to the first and second friction plates toward the bottom wall portion to have an axial length in the first pressure receiving section smaller than the axial length in the second pressure receiving section.

According to the construction of the friction engagement apparatus (7) as defined in the above description, the cylindrical wall portion in the range of the first pressure receiving section is formed to be bent from the bottom wall portion in the one axial direction, thereby making it possible to give the piston a predetermined bending stiffness when the piston is required to be small in size.

In the case that at least one of the warping arm portions is differentiated in shape from the other in the ranges of the first and second pressure receiving sections to have a fitness portion higher in the range of the first pressure receiving section than the fitness portion of the other in the range of the second pressure receiving section, an additional high stiffness portion may be formed on the return spring in symmetrical and opposing relationship with the high stiffness portion across the center axis of the return spring. With this construction of the warping arm portions, the piston can prevent the axial inclination with respect to the center axis of the piston at the times when the piston receives the oil pressure in the oil chamber and when the piston is returned to its original position by the return spring.

According to the friction engagement apparatus according the present invention, the annular member forming the urging means has a high stiffness portion in the range of the first pressure receiving section in which the piston is partly cut-off to have a cut-off recession so that the high stiffness portion can restrain the strain in the pressure imparting direction of the piston and the concentrated stress on the piston in the range of the first pressure receiving section. This means that the deformation of the piston is reduced to a minimum level even if the piston is produced small in size and formed with the cut-off recession to avoid from interfering with other elements and parts.

For achieving the above object of the present invention, the composite planetary gear apparatus according to the present invention comprises

BRIEF DESCRIPTION OF THE DRAWINGS

The foregoing and other objects, features, aspects and advantages of the present invention will become more apparent from the following detailed description of the present invention when taken in conjunction with the accompanying drawings, wherein.

DETAILED DESCRIPTION OF THE INVENTION

The preferred embodiment of the present invention will hereinafter be described with reference to the drawings.

First Embodiment

Figure 1:
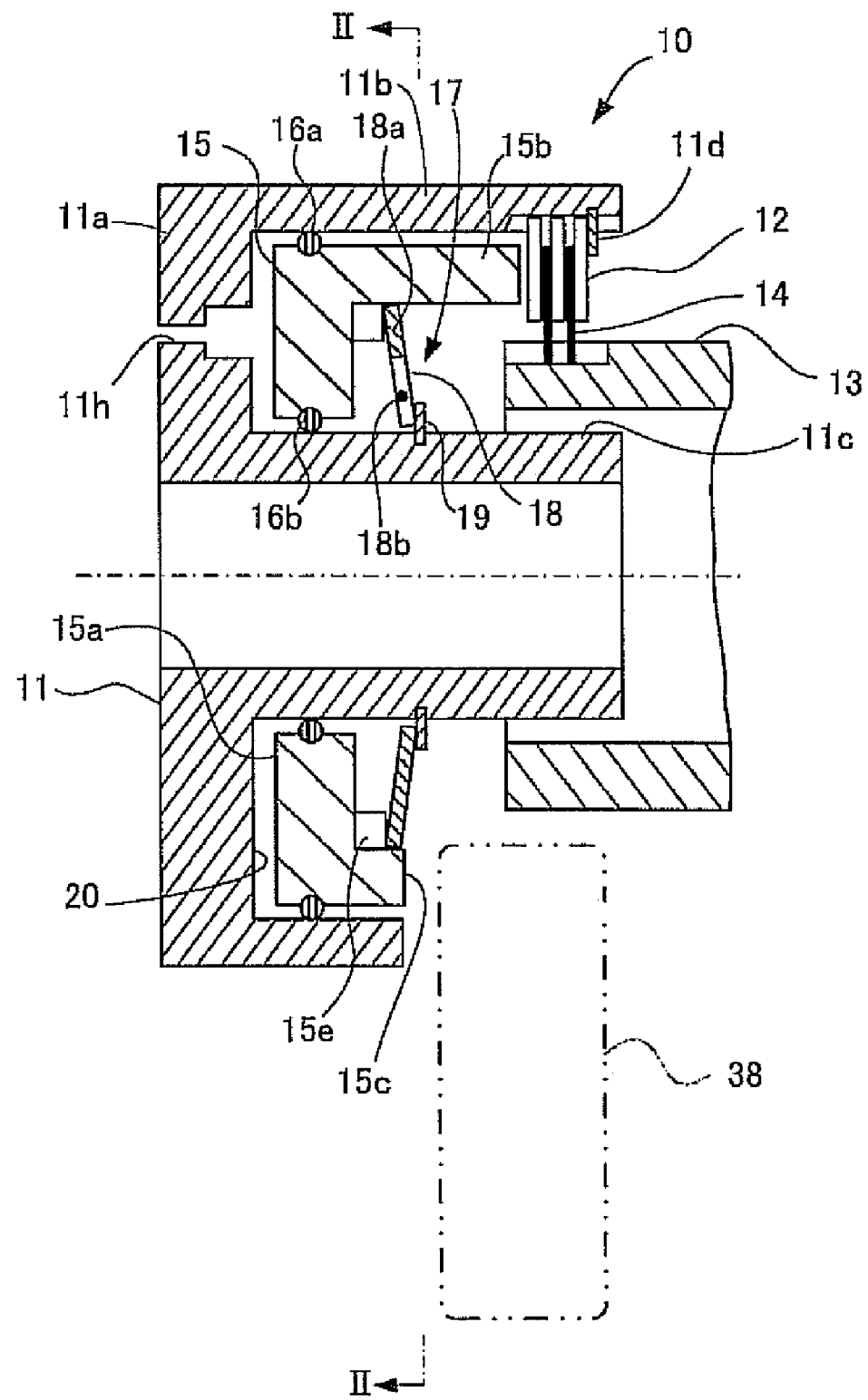
FIG. 1 is a longitudinal cross-sectional view schematically showing the first embodiment of the friction engagement apparatus according to the present invention.
Figure 2:
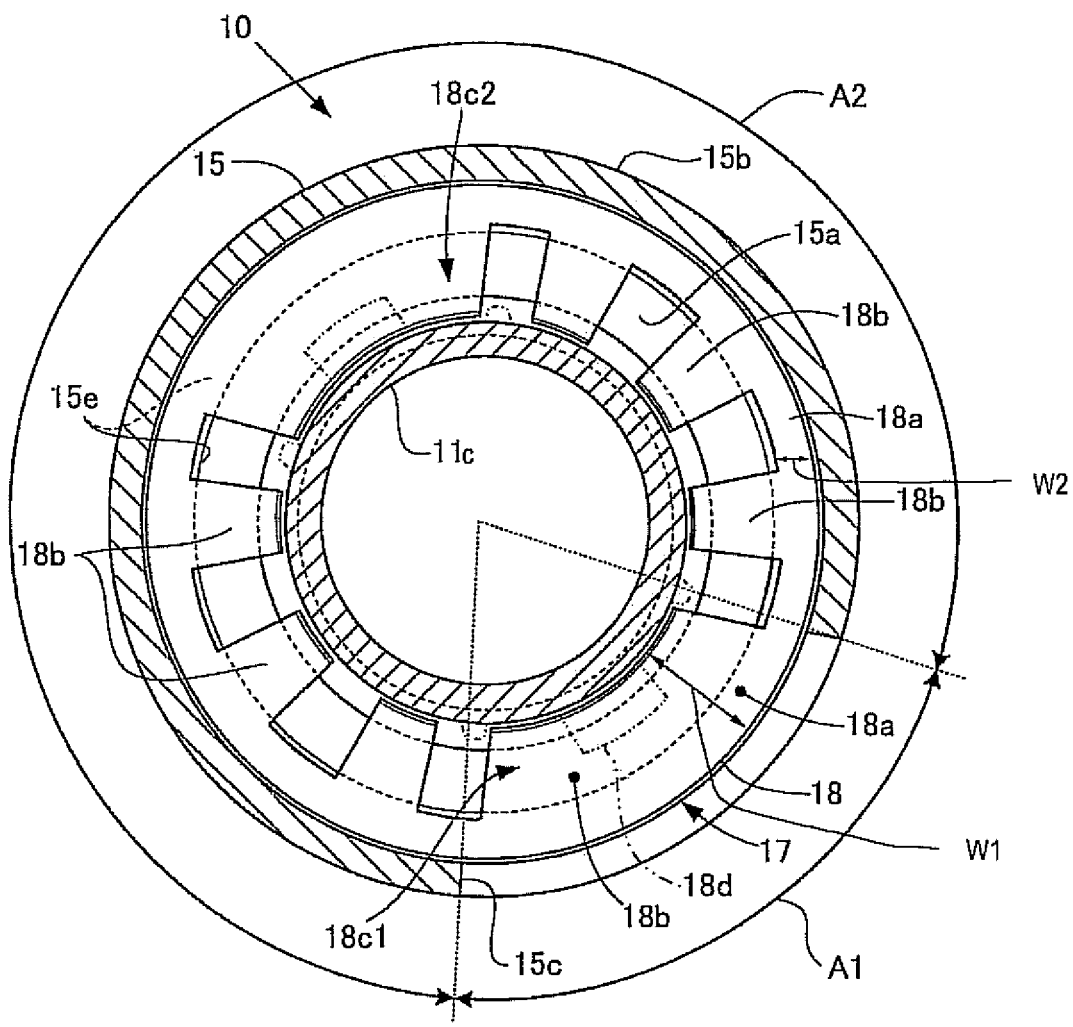
FIG. 2 is a cross-sectional view taken along the line II-II of FIG. 1 to schematically show the essential part of the first embodiment of the friction engagement apparatus according to the present invention.
Figure 3:
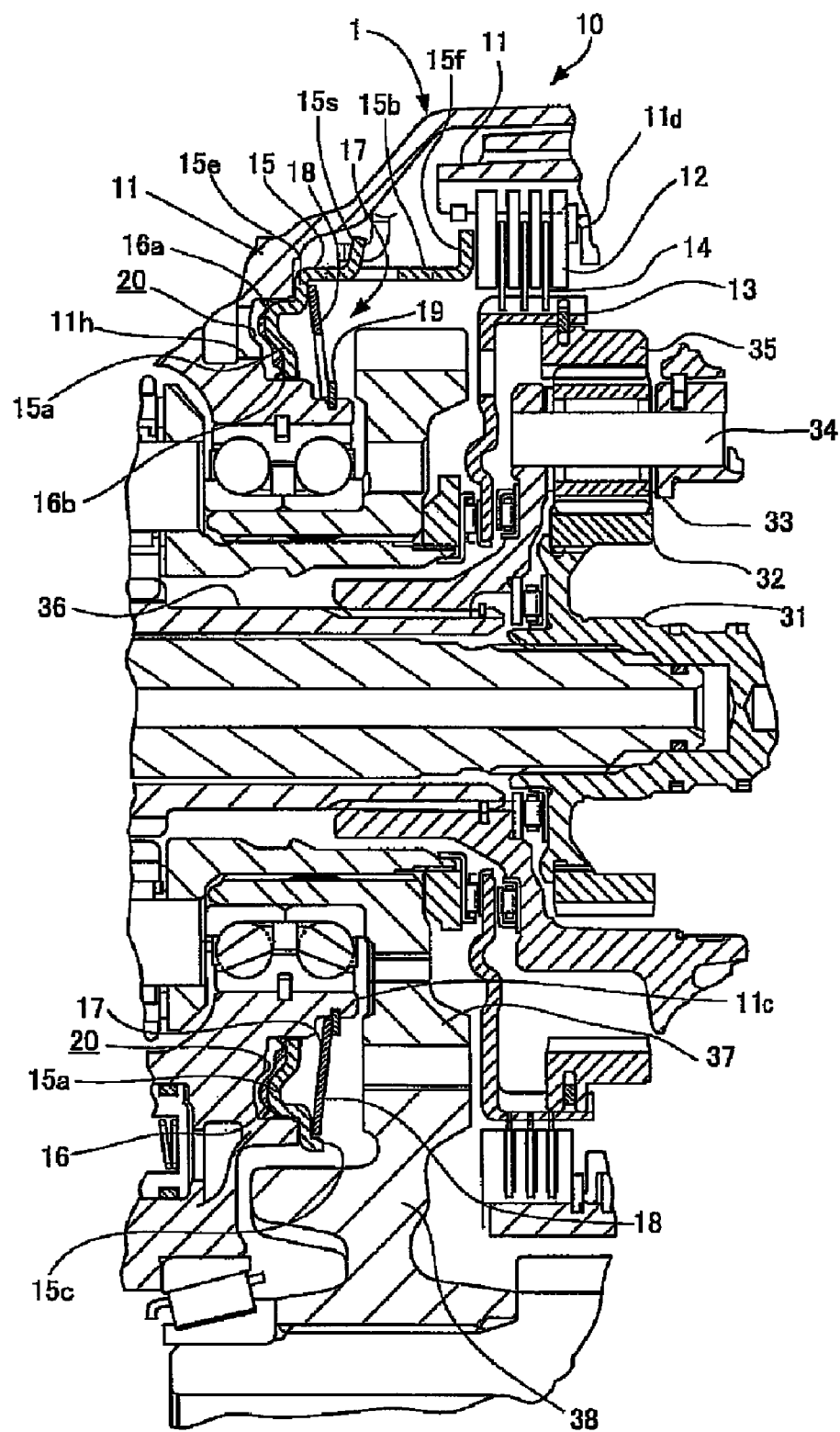
FIG. 3 is a fragmental cross-sectional view partly showing an automatic transmission apparatus assembled with the first embodiment of the friction engagement apparatus according to the present invention.

FIGS. 1 to 3 show the first embodiment of the friction engagement apparatus according to the present invention. FIG. 1 is a longitudinal cross-sectional view schematically showing the first embodiment of the friction engagement apparatus according to the present invention. FIG. 2 is a cross-sectional view taken along the line II-II of FIG. 1 to schematically show the essential part of the first embodiment of the friction engagement apparatus according to the present invention. FIG. 3 is a fragmental cross-sectional view partly showing an automatic transmission apparatus assembled with the first embodiment of the friction engagement apparatus according to the present invention.

The construction of the first embodiment of the friction engagement apparatus according to the present invention will now be explained in detail.

The first embodiment of the friction engagement apparatus 10 according to the present invention is schematically shown in FIG. 1 to be provided in the automatic transmission apparatus which serves as a power transmission apparatus. The overall outline construction of the automatic transmission apparatus is almost the same as that of the known automatic transmission apparatus, and thus can transmit the torque from an engine to the driven wheels while changing rotation speeds through a plurality of rotation elements accommodated in a transmission case. One of the above rotation elements serves as a speed changing brake constituting the friction engagement apparatus 10.

The friction engagement apparatus 10 comprises a cylindrical case 11 having a side portion 11a, an outer cylindrical portion 11b integrally formed with the outer peripheral end of the side portion 11a to axially extend, and an inner cylindrical portion 11c integrally formed with the inner peripheral end of the side portion 11a to axially extend in parallel relationship with the outer cylindrical portion 11b. The outer cylindrical portion 11b has an inner diameter, and the inner cylindrical portion 11c has an outer diameter smaller than the inner diameter of the outer cylindrical portion 11b to form an annular cavity between the outer cylindrical portion 11b and the inner cylindrical portion 11c. The friction engagement apparatus 10 further comprises a plurality of first friction plates 12 splined to the inner peripheral portion of the axial one end portion (i.e. the right end portion in FIG. 1) of the cylindrical case 11 to allow the first friction plates 12 to be axially movable with respect to the cylindrical case 11 and supported on the cylindrical case 11, a plurality of second friction plates 14 splined to one rotation element 13 among the rotation elements provided in the automatic transmission apparatus to allow the second friction plates 14 to be axially movable with respect to the rotation element 13 and rotatable together with the rotation element 13. The friction engagement apparatus 10 further comprises an annular piston 15 open toward the first and second friction plates 12, 14 and having an annular piston portion 15a, and a cylindrical wall portion 15b integrally formed with the outer peripheral portion of the annular piston portion 15a to impart the urging pressure to the first and second friction plates 12, 14. The annular piston 15 is slidably received in the annular cavity between the outer cylindrical portion 11b and the inner cylindrical portion 11c of the case 11 with seal members 16a and 16b disposed between and attached to the case 11 and the piston 15, respectively. The friction engagement apparatus 10 further comprises urging means 17 positioned between the inner cylindrical portion 11c of the case 11 and the cylindrical wall portion 15b of the piston 15 to urge the piston 15 in the left direction in FIG. 1, viz., in the axial direction to allow the first and second friction plates 12, 14 to be disengaged from each other.

The first friction plate 12 positioned remote from the piston 15 is stopped by a stop member 11d and thus held at the predetermined axial position of the case 11 so that the first friction plate 12 can be limited in movement toward the piston 15. Each of the second friction plates 14 is located between the first neighboring friction plates 12 so that the first and second friction plates 12 and 14 are alternately arranged in the axial direction of the case 11. The rotation element 13 partly constitutes the power transmission path in the automatic transmission apparatus as will become apparent as the description proceeds.

The annular piston portion 15a of the piston 15 constitutes a pressure receiving portion, and the cylindrical wall portion 15b of the piston 15 constitutes a pressure imparting portion. The piston 15 and the case 11 are combined to form therebetween an annular oil pressure chamber 20 having oil introduced therein to produce oil pressure therein. The cylindrical wall portion 15b is adapted to receive an urging force imparted toward the first friction plate 12 closest to the piston 15 among the first friction plates 12 by the oil pressure in the oil pressure chamber 20. The case 11 is formed with an oil passageway 11h functioning to allow the oil to be introduced into the oil pressure chamber 20 from an oil pressure control valve such as a linear solenoid valve and the like not shown in the drawings.

The friction engagement apparatus 10 is operative to assume a friction engagement state where the first and second friction plates 12 and 14 are engaged with each other when the piston 14 is urged by the oil pressure in the oil pressure chamber 20 maintained at a high level to move toward the first friction plate 12 closest to the piston 15 among the first friction plates 12, and a friction disengagement state where the first and second friction plates 12 and 14 are disengaged from each other when the piston 14 is urged by the urging means 17 against the oil pressure in the oil pressure chamber 20 decreased to a lowest level to move away from the first friction plate 12 closest to the piston 15 among the first friction plates 12. The above construction and operation of the friction engagement apparatus 10 are well known in the art and thus will not be described in detail hereinafter. The first friction plates 12 and the second friction plates 14 may be replaced by a first friction plate and a second friction plate according to the present invention.

The cylindrical wall portion 15b of the piston 15 has a cut-off recession 15c, i.e., a notched recess 15c formed by partly cutting-off the circumferential portion of the piston 15 facing the rotation element 13. The cut-off recession 15c is in a U-shape and opened toward the rotation element 13 in a predetermined angular range of the cylindrical wall portion 15b, viz., a predetermined circumferential section of the cylindrical wall portion 15b to axially extend toward pressure receiving portion 15a. The cut-off recession 15c has a predetermined circumferential length and a predetermined axial length as will be seen in FIGS. 1 and 2. The piston 15 has a first pressure receiving section A1 circumferentially extending in the range of the cut-off recession 15c, and a second pressure receiving section A2 also circumferentially extending in the range excluding the cut-off recession 15c.

The piston 15 is shown in FIG. 3 as constituted by a sheet metal member, i.e., metal plate member produced by a press working. The piston 15 shown in FIG. 3 has a seal member 16 which is attached to the sheet metal member in such a way that the seal member 16 having the seal portions 16a and 16b made of a resilient material is vulcanized in an appropriate process and then adhered to the outer and inner peripheral surfaces of the piston portion 15a, i.e., the pressure receiving portion 15a of the piston 15, to seal annular gaps between the case 11 and the piston portion 15.

The sheet metal member forming an essential part of the piston 15 has a bottom wall portion constituting the annular piston portion 15a, i.e., the pressure receiving portion and a cylindrical wall portion constituting the cylindrical wall portion 15b, i.e., the pressure imparting portion bent from the bottom wall portion in the one axial direction (right direction in FIG. 3). The cylindrical wall portion 15b is cut off in a U-shape from its axial end opposing to the first and second friction plates 12, 14 toward the bottom wall portion to form the cut-off recession 15c.

The cut-off recession 15c of the cylindrical wall portion 15b circumferentially extending in the first pressure receiving section A1 leads to the fact that the cylindrical wall portion 15b has an axial length in the first pressure receiving section A1 smaller than the axial length in the second pressure receiving section A2.

The urging means 17 is constituted by a return spring 18 coaxially arranged with the piston 15 between the inner cylindrical portion 11b of the case 11 and the cylindrical wall portion 15b of the piston 15, and a stop ring 19 secured to the inner cylindrical portion 11b of the case 11. The stop ring 19 is constituted by a C-shaped ring having a slit between the circumferential ends of the ring 19.

The return spring 18 is roughly in an annular shape and is internally toothed to constitute an annular member and an annular plate spring defined in the present invention.

The return spring 18 has an annular plate portion 18a coaxially arranged with the annular piston 15 and a plurality of warping arm portions 18b radially inwardly extending from the annular plate portion 18a and circumferentially spaced apart from each other. Each of the warping arm portions 18b has a trapezoidal shape tapered toward the radially inner end of thereof. The plate portion spring 18a is roughly in an annular shape to form part of the return spring 18, while each of the warping arm portions 18b forms a cantilever fashioned plate spring radially inwardly projecting from the annular plate portion 18a. The cantilever fashioned plate spring constitutes the resilient member defined in the present invention.

The return spring 18 thus constructed and arranged serves to resiliently urge the piston 15 in the left direction in FIG. 1, viz., in the axial direction to allow the first and second friction plates 12, 14 to be disengaged from each other.

The return spring 18 is previously mentioned to be roughly in an annular shape as shown in FIGS. 1 and 3, but exactly has a truncated cone shape flaring toward the annular piston portion 15a of the piston 15 with the radially outer end of the return spring 18 being axially close to the annular piston portion 15a and held in engagement of the inner surface of the cylindrical wall portion 15b of the piston 15 and with the radially inner end of the return spring 18 being axially remote from the annular piston portion 15a and held in engagement of the outer surface of the inner cylindrical portion 11c of the case 11 in the state that the return spring 18 is coaxially arranged with the piston 15.

It will therefore be understood that the piston 15 can assume an engagement position where the first friction plates 12 are engaged with the second friction plates 14 when the oil pressure of the oil becomes high in the oil pressure chamber 20 with the oil introduced into the pressure chamber 20 to move the piston 15 toward the first friction plates 12, 14 against the resilient force of the warping arm portions 18b of the return spring 18, while the piston 15 can assume an disengagement position where the first friction plates 12 are disengaged with the second friction plates 14 when the oil pressure of the oil becomes low in the oil pressure chamber 20 with no oil introduced into the pressure chamber 20 to move the piston 15 away from the first friction plates 12, 14 under the influence of the resilient force of the warping arm portions 18b of the return spring 18.

The return spring 18 has a bending stiffness in the pressure imparting direction with respect to a predetermined circumferential length of the return spring 18, the stiffness in the range of the first pressure receiving section A1 being larger than the stiffness in the range of the second pressure receiving section A2. The reason will become apparent as the description proceeds.

As shown in FIG. 2, the return spring 18 has a first pressure receiving section and a second pressure receiving section respectively axially aligned with the first pressure receiving section A1 and the second pressure receiving section A2 of the piston 15. The return spring 18 has a first radial width W1 in the range of the first pressure receiving section A1, and a second radial width W2 in the range of a second pressure receiving section A2 between the two neighboring warping arm portions 18b, the first radial width W1 being larger than the second radial width W2.

In addition, the circumferential width of the warping arm portions 18b of the return spring 18 in the range of the first pressure receiving section A1 is larger than the circumferential width of each of the warping arm portions 18b in the range of the first pressure receiving section A2.

The fact that the first radial width W1 of the return spring 18 in the range of the first pressure receiving section A1 is larger than the second radial width W2 of the return spring 18 in the range of the second pressure receiving section A2 between the two neighboring warping arm portions 18b and that the circumferential width of the warping arm portion 18b of the return spring 18 in the range of the first pressure receiving section A1 is larger than the circumferential width of each of the warping arm portions 18b in the range of the first pressure receiving section A2, leads to the fact that the return spring 18 has a bending stiffness in the range of the first pressure receiving section A1 larger than in the range of the second pressure receiving section A2. In other words, the return spring 18 has a bending resilience in the range of the first pressure receiving section A1 lower than in the range of the second pressure receiving section A2.

In the case that the return spring 18 in the range of the first pressure receiving section A1 has a sufficiently high stiffness, the annular plate portion 18a in the range of the first pressure receiving section A1 may be formed with a groove 18d opened at the radially inner end surface thereof as shown by two dotted lines in FIG. 2.

In the case of the return spring 18 shown in FIG. 2, the warping arm portions 18b of the return spring 18 is resiliently bent when the first and second friction plates 12, 14 are pushed by the piston 15 receiving the oil pressure in the oil pressure chamber 20. The spring constant of the annular plate portion 18a and the warping arm portions 18b combined per an angle unit range in the range of the first pressure receiving section A1 is larger than the spring constant of the annular plate portion 18a and the warping arm portions 18b combined per an angle unit range in the range of the second pressure receiving section A2.

When the piston 15 is released from the oil pressure in the oil pressure chamber 20 to allow the first and second friction plates 12, 14 to be disengaged from each other, the reaction force generated on the warping arm portions 18b per an angle unit range in the range of the first pressure receiving section A1 is set at a value equal to or somewhat smaller than the reaction force generated on the warping arm portions 18b per an angle unit range in the range of the second pressure receiving section A2. When, on the other hand, the oil pressure in the oil pressure chamber 20 is exerted on the piston 15 to push the piston 15 to allow the first and second friction plates 12, 14 to be engaged with each other, the warping arm portions 18b of the return spring 18 is resiliently bent by the piston 15. At this time, the reaction force generated on the warping arm portions 18b per an angle unit range in the range of the first pressure receiving section A1 is sufficiently larger than the reaction force generated on the warping arm portions 18b per an angle unit range in the range of the second pressure receiving section A2 by the reason that the spring constant of the annular plate portion 18a and the warping arm portions 18b combined per an angle unit range in the range of the first pressure receiving section A1 is larger than the spring constant of the annular plate portion 18a and the warping arm portions 18b combined per an angle unit range in the range of the second pressure receiving section A2.

The friction engagement apparatus according to the present embodiment previously mentioned is assembled in an automatic transmission mechanism forming part of the automatic transmission apparatus fragmentally shown in cross-section in FIG. 3. The automatic transmission mechanism is constituted partly by a gear train of the planetary gear type having a plurality of planetary gear sets. FIG. 3 shows only the peripheral portion of the first planetary gear set.

The automatic transmission mechanism shown in FIG. 3 comprises an input shaft 31 for inputting the rotation torque from a turbine runner of a torque convertor not shown, a sun gear 32 splined to the input shaft 31, a plurality of pinion gears 33 positioned around and held in mesh with the sun gear 32, a pinion carrier 34 rotatably supporting the pinion gears 33 circumferentially equally spaced apart from one another to have the pinion gears 33 held in mesh with the sun gear 32 and to allow the pinion gears 33 to be rotated around their respective axes and around the sun gear 32, and a ring gear 35 supported on the rotation element 13 to surround the pinion gears 33 and to be held in mesh with the pinion gears 33.

The rotation element 13 is coupled with the case 1 of the automatic transmission apparatus through the case 11 by the friction engagement apparatus functioning as a brake when the first friction plates 12 is brought into engagement with the second friction plates 14 as previously explained. It will therefore be understood that the ring gear 35 can be restricted from rotation through the rotation element 13 and the friction engagement apparatus 10 by the case 1 of the automatic transmission apparatus. This means that the ring gear 35 can selectively be rotated and braked.

When the ring gear 35 is restricted from rotation by the case 1, the pinion gears 33 is rotated around their own axes and around the sun gear 32 in response to the rotation of the sun gear 32 receiving the inputted rotation torque from the input shaft 31 in the ring gear 35 so that the pinion carrier 34 outputs the inputted rotation at a predetermined reduction speed ratio to the rotation shaft 36 in the second planetary gear set.

When the friction engagement apparatus is operative to be released from the engagement state to allow the ring gear 35 to be rotated, the pinion gears 33 is rotated around their own axes at a reduced speed and rotated around the sun gear 32 at an increased speed with respect to the rotation of the input shaft 31 by the rotation of the ring gear 35 so that the rotation shaft 36 in the second planetary gear set is inputted from the pinion carrier and rotated at an increased speed. The construction and operation of the automatic transmission mechanism of the planetary gear type are well known in the art.

The piston 15 has a counter drive gear 37 arranged therein to serve as an output element for outputting the rotation to the driven wheels not shown. The counter drive gear 37 is held in mesh with a counter driven gear 38 disposed to extend through the cut-off recession 15c. The piston 15 has a stopper portion 15s radially outwardly bent from the part of the outer peripheral surface of the piston 15 so that the piston 15 is axially slidable with respect to the case 11 but restricted from being rotated around its own axis.

The annular plate portion 18a of the return spring 18 is engaged at its outer peripheral portion like a plate spring with an annular step portion 15e formed between the outer peripheral portion of the piston portion 15a and the base portion of the cylindrical wall portion 15c of the piston 15. The inner peripheral end portions of the warping arm portions 18b of the return spring 18 are engaged with the outer peripheral surface of the inner cylindrical portion 11c of the case 11 close to the counter drive gear 37 and are axially stopped by a stop spring 19.

The cylindrical wall portion 15b of the piston 15 has a flange 15f bent radially outwardly at its axial end close to the friction plate 12 and has an outer diameter gradually reduced toward the annular piston portion 15a from the flange 15f. The cylindrical wall portion 15b of the piston 15 has no flange 15f in the circumferential range because of the cut-off recession 15c of the piston 15. The flange 15f extends to cover the second pressure receiving section A2, and thus is formed roughly in C-shape when seen from the axial end of the cylindrical wall portion 15b of the piston 15 facing the friction plate 12.

In the present embodiment, the return spring 18 has a bending stiffness in the one axial direction with respect to a predetermined circumferential length of the annular member, the stiffness of the return spring 18 in the range of the first pressure receiving section A1 being larger than the stiffness of the return spring 18 in the range of the second pressure receiving section A2 to give a high stiffness to the return spring 18 in the range of the first pressure receiving section A1. This means that the return spring 18 has a larger stiffness portion, i.e. a high stiffness portion indicated by the reference numeral 18c1 in FIG. 2.

According to the present invention, an additional high stiffness portion 18c2 may be formed on the return spring 18 in symmetrical and opposing relationship with the high stiffness portion 18c1 across the center axis of the return spring 18, viz., at a circumferential position circumferentially spaced apart 180 degrees from the high stiffness portion 18c1 on the return spring 18 in order to balance the pressure force imparted on the return spring 18 in the circumferential direction thereof in the present embodiment of the friction engagement apparatus 10. In the case of the above arrangement of the high stiffness portions 18c1 and 18c2 on the return spring 18, the piston 15 can prevent the axial inclination with respect to the center axis of the piston 15 and that the return spring 18 can easily be assembled with the piston 15 due to the high stiffness portions 18c1 and 18c2 circumferentially spaced apart from each other at 180 degrees, thereby enabling the assembling operation of the return spring 18 to be carried out with only the rotation of the return spring 18 within 180 degrees.

The return spring 18 has a pair of narrow grooves formed between each of the high stiffness portions 18c1 and 18c2 and the warping arm portions 18b closest to each of the high stiffness portions 18c1 and 18c. Each of the grooves has a circumferential length smaller than those of the remaining warping arm portions 18b.

The operation of the friction engagement apparatus 10 previously mentioned will be described hereinafter.

The friction engagement apparatus 10 thus constructed is operated with the oil being selectively fed to the oil pressure chamber 20 to increase the oil pressure of the oil in the oil pressure chamber 20 and not fed to the oil chamber 20 to release the oil pressure from the oil pressure chamber 20 through the oil pressure control valve.

When the oil is fed to the oil pressure chamber 20 to increase the oil pressure of the oil in the oil pressure chamber 20, the oil pressure is imparted to the piston 15 so that the piston 15 is axially moved to impart the oil pressure to the first and second friction plates 12, 14 to establish the friction engagement state, i.e. the coupling state of the first and second friction plates 12, 14. When, on the other hand, the oil is not fed to the oil pressure chamber 20 to release the oil pressure from the oil pressure chamber 20, the first friction plates 12 are disengaged from the second friction plates 14 to establish the friction disengagement state, i.e., the decoupling state of the first and second friction plates 12, 14.

Under the friction engagement state of the friction engagement apparatus 10, the piston 15 receives a load equally distributed by the oil pressure of the oil in the oil pressure chamber 20 and a reaction force from the engaged first and second friction plates 12, 14 in the range of the second pressure receiving section A2 to be exerted on the cylindrical wall portion 15b extending therein. The piston 15 receives the load equally distributed by the oil pressure of the oil in the oil pressure chamber 20 but do not receive the reaction force from the first and second friction plates 12, 14 engaged with each other in the range of the first pressure receiving section A1 with the cut-off recession 15c extending therein. In addition, the annular piston portion 15a and the cylindrical wall portion 15b extending in the range of the first pressure receiving section A1 are supported by the circumferential ends of the annular piston portion 15a and the cylindrical wall portion 15b extending in the range of the first pressure receiving section A2 with the axial length of the cylindrical wall portion 15b in the range of the first pressure receiving section A1 smaller than that of the cylindrical wall portion 15b in the range of the second pressure receiving section A2. The annular piston portion 15a and the cylindrical wall portion 15b extending in the range of the first pressure receiving section A1 are therefore inclined to easily totally receive a concentrated bending force and concentrated stress generated by the oil pressure in the axial direction toward the rotation element 13.

In view of the foregoing phenomenon, the return spring 58 exemplified in the present embodiment is constructed in such a manner that the spring constant of the warping arm portions 18b per an angle unit range in the range of the first pressure receiving section A1 is larger than the spring constant of the warping arm portions 18b per an angle unit range in the range of the second pressure receiving section A2 so that the total stiffness of the piston 15 and the return spring 18 can be circumferentially equally maintained by the return spring 18 even with the cut-off recession 15c formed in the cylindrical wall portion 15b of the piston 15. The annular piston portion 15a extending in the range of the first pressure receiving section A1 and the cylindrical wall portion 15b of the piston 15 having a short axial length are effectively restricted in deformation, and thus reduced to a minimum level in the concentrated stress exerted thereon. This means that there is no excessive strain and deformation of the cylindrical wall portion 11c of the piston 15 in the vicinity of the cut-off recession 15c even with the piston 15 relatively small in diameter.

In the present embodiment of the friction engagement apparatus 10 previously described, the urging means 17 has an essential portion constructed by the return spring 18 made of an annular plate spring. The return spring 18 can be set to have an appropriate dimension to have the bending stiffness in the one axial direction with respect to a predetermined circumferential length of the annular member, the bending stiffness in the range of the first pressure receiving section A1 being easily differentiated from the bending stiffness in the range of the second pressure receiving section A2. The return spring 18 is constituted by a plate spring functioning to impart a restoration force to the piston 15 so that the axial length of the friction engagement apparatus 10 can be reduced.

The annular plate portion 18a and the warping arm portions 18b of the return spring 18 are constituted by a plate spring having a resilient member for generating the restoration force and an annular member supporting the resilient member so that at least one of the annular plate portion 18a and the warping arm portions 18b of the return spring 18 can be different in shape from each other in the first pressure receiving section A1 and the second pressure receiving section A2. This means that the bending stiffness in the one axial direction with respect to a predetermined circumferential length of the annular member can easily be changed, and that the high bending stiffness portion is easily recognized from the high bending stiffness portion.

As described in the above, the return spring 18 is formed in such a shape that the return spring 18 has a first radial width W1 in the range of the first pressure receiving section A1, and a second radial width W2 in the range of the second pressure receiving section A2 between the two neighboring warping arm portions 18b, the first radial width W2 being larger than the second radial width W2, and that the circumferential width of the warping arm portions 18b of the return spring 18 in the range of the first pressure receiving section A1 is larger than the circumferential width of each of the warping arm portions 18b in the range of the second pressure receiving section A2. As a result, the bending stiffness in the range of the first pressure receiving section A1 can easily be differentiated from the stiffness in the range of the second pressure receiving section A2, thereby enabling the high stiffness portions 18c1 and 18c2 to easily be recognized and discriminated. The shape of the return spring 18 previously explained makes it possible for a worker to easily handle and assemble the return spring 18 in the friction engagement apparatus 10.

The fact that the piston 15 is formed by a metal sheet member produced through a press working and attached with the seal member 16 between the piston 15 and the case 11 can facilitate to have the piston 15 produced with a thin thickness and can reduce the time needed to assemble the piston 15 in the case 11. This makes it possible to facilitate the assembling operation of the friction engagement apparatus, and to realize the lightening of the piston and the reduction of its cost even with the piston relatively large in size.

The fact that the cylindrical wall portion 15b of the piston 15 has a cut-off recession 15c in the pressure receiving section A1 of the piston 15 to allow the counter drive gear 37 to be held in mesh with the counter driven gear 38, and that the cylindrical wall portion 15b of the piston 15 is bent from the annular piston portion 15a along the high stiffness portion 18c1 of the return spring 18 makes it possible for the cylindrical wall portion 15b to have a predetermined sufficient bending stiffness near the cut-off recession 15c even in the case that the piston 15 is produced small in size.

As will be understood from the foregoing description, according to the present embodiment of the friction engagement apparatus, the high stiffness portion 18c1 of the return spring 18 in the first pressure receiving section A1 causes the piston 15 to be restrained from being bent in the axial direction, i.e., the pressure imparting direction and to be restrained in stress concentration in the first pressure receiving section A1, thereby making it possible to have piston 15 restrained from being unnecessarily deformed and being concentrated in stress even in the case that the piston 15 is produced in a small size and formed with the cut-off recession 15c to prevent the piston 15 from interfering with other mechanical parts and elements. This advantageous effect of the friction engagement apparatus enables to provide a friction engagement apparatus suitable for a power transmission apparatus small in size.

Second Embodiment

Figure 4:
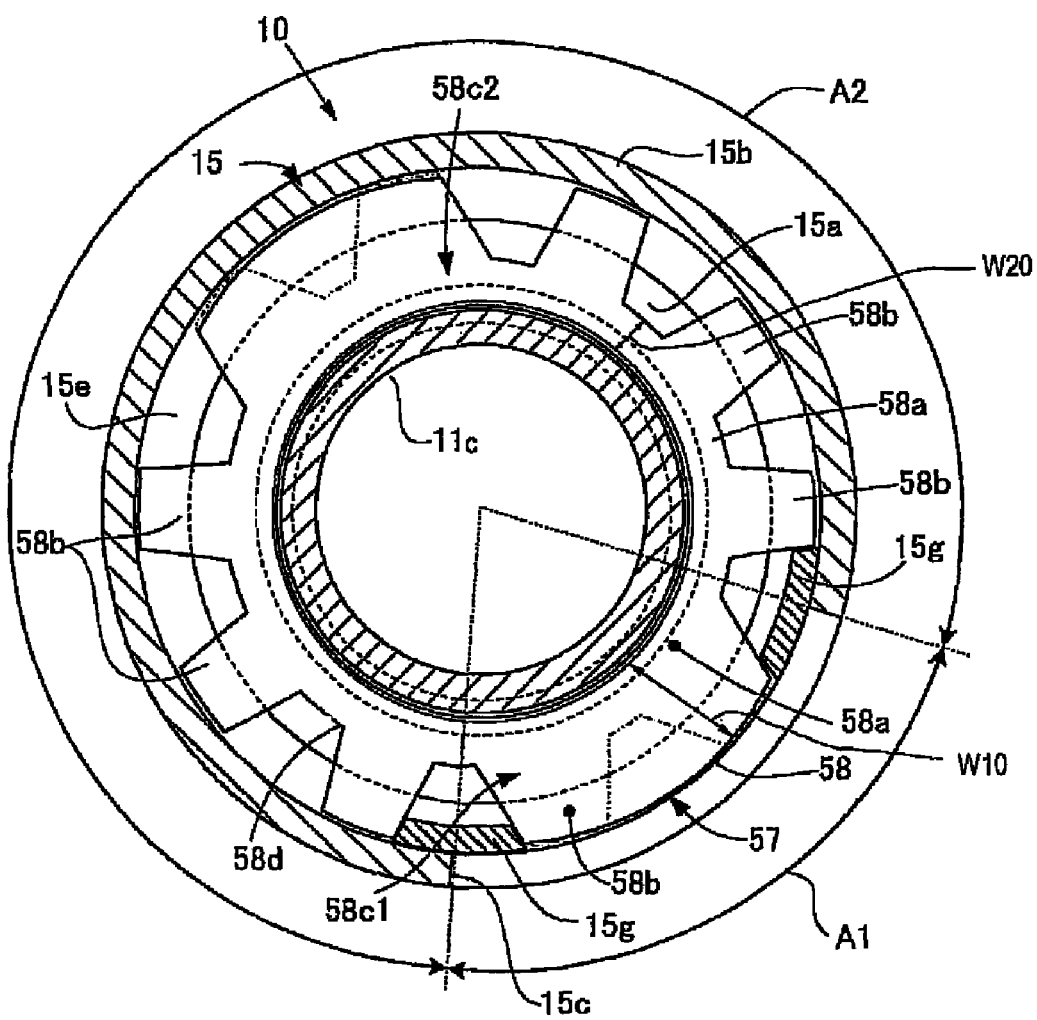
FIG. 4 is a cross-sectional view similar to FIG. 2 but showing the essential part of the second embodiment of the friction engagement apparatus according to the present invention.
Figure 5:
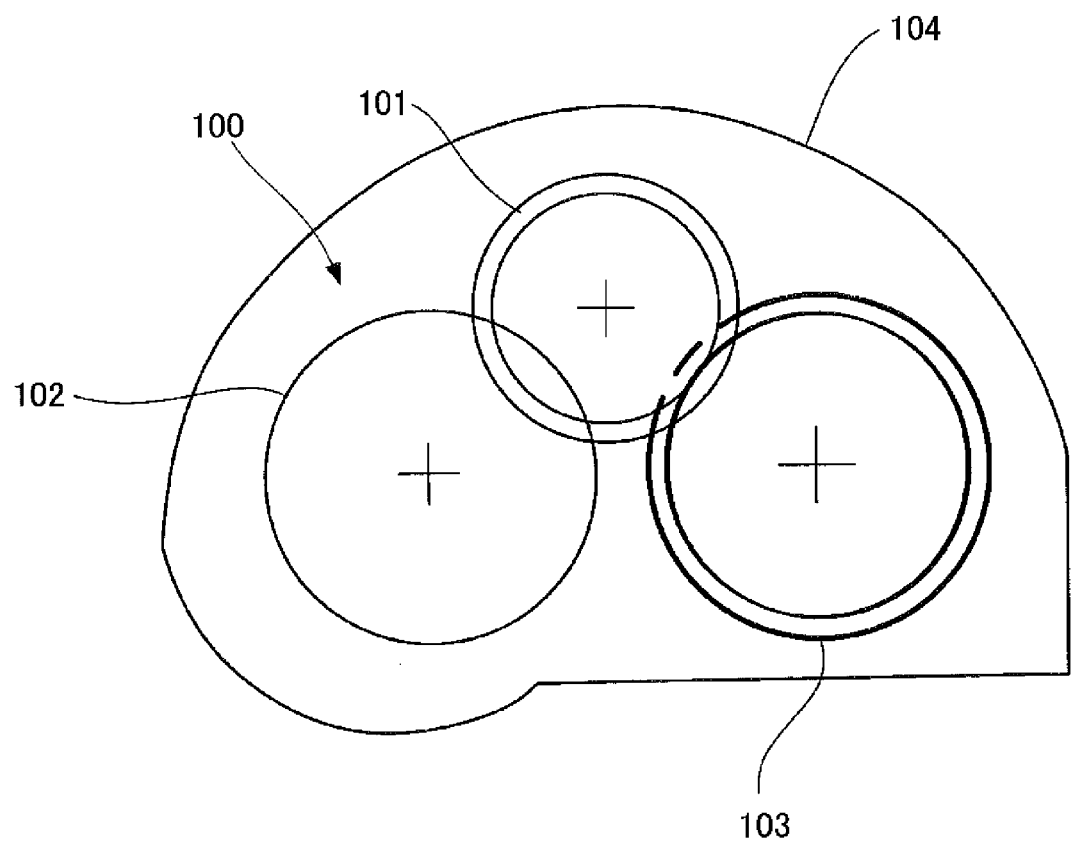
FIG. 5 is a schematic view showing a plurality of gears and shafts supporting the gears in parallel with each other, the gears and shafts being accommodated in the case forming part of a conventional power transmission apparatus used for an automotive vehicle.

FIG. 4 is a cross-sectional view similar to FIG. 2 but showing the essential part of the second embodiment of the friction engagement apparatus according to the present invention.

The second embodiment of the friction engagement apparatus is different in construction from the first embodiment of the friction engagement apparatus in the aspect of the urging means. With the urging means of the second embodiment thus changed in construction, the second embodiment of the friction engagement apparatus is shown in FIG. 4 as comprising a piston 15 having an inner circumferential shape somewhat modified from that of the first embodiment of the friction engagement apparatus. The other elements and parts forming part of the second embodiment of the friction engagement apparatus is the same as those of the first embodiment of the friction engagement apparatus. For this reason, the other elements and parts of the second embodiment of the friction engagement apparatus the same in construction as those of the first embodiment of the friction engagement apparatus are shown in FIG. 4 to respectively bear the same reference numerals same as those of the first embodiment of the friction engagement apparatus appearing in FIGS. 1 to 3. Only the elements and parts of the second embodiment of the friction engagement apparatus different in construction from those of the first embodiment of the friction engagement apparatus will be explained hereinafter.

In the second embodiment, the urging means 57 intervening between the case 11 and the piston 15 to urge the piston 15 to allow the first friction plates 12 to be disengaged from the second friction plates 14 is constituted by a return spring 58 coaxially arranged with the piston 15 between the outer cylindrical portion 11b and the inner cylindrical portion 11c of the case 11. As shown in FIG. 4, the return spring 58 is roughly in an annular shape and is externally toothed to constitute an annular member and an annular plate spring defined in the present invention.

The return spring 58 is shown in FIG. 4 as having a plurality of projections, i.e., teeth radially outwardly projecting, while the return spring 18 is shown in FIG. 2 as having a plurality of projections, i.e., teeth radially inwardly projecting. This means that the return spring 58 externally toothed in FIG. 4 is different in shape from the return spring 18 internally toothed in FIG. 2.

The return spring 58 has an annular plate portion 58a coaxially arranged with the annular piston 15 and a plurality of warping arm portions 58b radially outwardly extending from the annular plate portion 58a and circumferentially spaced apart from each other. Each of the warping arm portions 58b has a trapezoidal shape tapered toward the radially outer end of thereof. The annular plate portion 58a is roughly in an annular shape as part of the return spring 58 constituting the annular member. Each of the warping arm portions 58b forms a cantilever fashioned plate spring radially outwardly projecting from the annular plate portion 58a. The cantilever fashioned plate spring constitutes the resilient member defined in the present invention.

The return spring 18 has a bending stiffness in the oil pressure acting direction, i.e., the pressure imparting direction with respect to a predetermined circumferential length of the return spring 18. The stiffness in the range of the first pressure receiving section A1 is larger than the stiffness in the range of the second pressure receiving section A2.

As shown in FIG. 4, the return spring 58 has a first radial width W10 in the range of the first pressure receiving section A1, and a second radial width W20 in the range of the second pressure receiving section A2 between the two neighboring warping arm portions 58b, the first radial width W10 being larger than the second radial width W20.

In addition, the circumferential width of the warping arm portions 58b of the return spring 58 in the range of the first pressure receiving section A1 is larger than the circumferential width of each of the warping arm portions 58b in the range of the second pressure receiving section A2.

The fact that the first radial width W10 of the return spring 58 in the range of the first pressure receiving section A1 is larger than the second radial width W20 of the return spring 58 in the range of the second pressure receiving section A2 between the two neighboring warping arm portions 58b and that the circumferential width of the warping arm portion 58b of the return spring 58 in the range of the first pressure receiving section A1 is larger than the circumferential width of each of the warping arm portions 58b in the range of the first pressure receiving section A2, leads to the fact that the return spring 58 has a bending stiffness in the range of the first pressure receiving section A1 larger than in the range of the second pressure receiving section A2. In other words, the return spring 58 has a bending resilience in the range of the first pressure receiving section A1 lower than in the range of the second pressure receiving section A2.

In the case of the return spring 58 shown in FIG. 4, the warping arm portions 58b of the return spring 58 are resiliently bent when the first and second friction plates 12, 14 are pushed by the piston 15 receiving the oil pressure in the oil pressure chamber 20. The spring constant of the annular plate portion 58a and the warping arm portions 58b combined per an angle unit range in the range of the second pressure receiving section A1 is larger than the spring constant of the annular plate portion 58a and the warping arm portions 58b combined per an angle unit range in the range of the first pressure receiving section A2.

The reaction force generated on the warping arm portions 58b per an angle unit range in the range of the first pressure receiving section A1 when the piston 15 is released from the oil pressure in the oil pressure chamber 20 is set at a value equal to or somewhat smaller than the reaction force generated on the warping arm portions 58b per an angle unit range in the range of the second pressure receiving section A2.

When, on the other hand, the oil pressure in the oil pressure chamber 20 is exerted on the piston 15 to push the piston 15 and to allow the first and second friction plates 12, 14 to be engaged with each other, the warping arm portions 58b of the return spring 58 is bent by the piston 15. At this time, the reaction force generated on the warping arm portions 58b per an angle unit range in the range of the first pressure receiving section A1 is sufficiently larger than the reaction force generated on the warping arm portions 58b per an angle unit range in the range of the second pressure receiving section A2 by the reason that the spring constant of the warping arm portions 58b per an angle unit range in the range of the first pressure receiving section A1 is larger than the spring constant of the warping arm portions 58b per an angle unit range in the range of the second pressure receiving section A2.

The outer peripheral and circumferential end portions of the high stiffness portions 58c1 and 58c2 of the return spring 58 are curved at a radius of curvature smaller than that of the outer peripheral end of the return spring 58 to ensure that the circumferentially central portion of each of the high stiffness portions 58c1 and 58c2 of the return spring 58 is brought into contact with the piston 15 before the outer peripheral and circumferential end portions of the high stiffness portions 58c1 and 58c2 of the return spring 58 is brought into contact with the piston 15 when the oil pressure is exerted on the piston 15. The outer peripheral and circumferential end portions of the warping arm portions 58b may be curved at a radius of curvature equal to the radius of the peripheral surface of the return spring 58, and may be curved at a small radius of curvature like the outer peripheral and circumferential end portions of the high stiffness portions 58c1 and 58c2.

Adjacent to the circumferential ends of the cut-off recession 15c of the piston 15 is a stepped portion 15e (see FIG. 3) bent radially outwardly from the annular piston portion 15a. Radially inwardly protruded from the inner surface of the cylindrical wall portion 15b toward the return spring 58 is a pair of protrusions 15g (see FIG. 4) which serves to position the piston in the circumferential direction thereof as well as to reinforce the mechanical strength of the piston 15. Also, axially protruded from the inner surface of the stepped portion 15e (see FIG. 1) toward the return spring 58 is a pair of protrusions (see FIG. 4) which serves to position the piston 15 in the axial direction thereof as well as to reinforce the mechanical strength of the piston 15.

In order to prevent the bending and concentrated stress generated on the annular piston portion 15a in the range of the second pressure receiving section A2, the annular piston portion 15a in the range of the first pressure receiving section A1, and the cylindrical wall portion 15b having a short axial length when the first friction plates 12 are brought into engagement with the second friction plates 14, the return spring 58 is constructed in such a manner that the spring constant of the warping arm portions 58b per an angle unit range in the range of the first pressure receiving section A1 is larger than the spring constant of the warping arm portions 58b per an angle unit range in the range of the second pressure receiving section A2 so that the stiffness of the piston 15 can be circumferentially equally maintained by the return spring 58. This results in the fact that the annular piston portion 15a in the range of the first pressure receiving section A1, and the cylindrical wall portion 15b having a short axial length can effectively be restrained from being deformed, and that the annular piston portion 15a in the range of the first pressure receiving section A1 can be restrained from being concentrated in stress.

While there has been described in the foregoing descriptions of the first and second embodiments about the return spring 18 and 58 serving as the urging means and thus respectively constituted by plate springs internally and externally toothed, the urging means does not need to be constituted by the above mentioned plate springs 18 and 58, but may include an urging device having an annular member (including a cylindrical member) having a high stiffness, and a plurality of resilient members each in a plate shape or an arm shape and radially extending from the annular member according to the present invention.

In addition, the urging means may be replaced by an urging device including an annular member having a high stiffness and a plurality of supporting arm portions radially extending from the annular member, the supporting arm portions each having a compression coil spring mounted thereon to be urged by the piston according to the present invention.

In the case that the urging means is constituted by a plate spring, the annular member is explained as being either internally or externally toothed, however, the annular member may be replaced by an annular member having inner and outer annular portions radially spaced apart from each other, and a plurality of warping arm portions each having inner and outer end portions integrally connected to the inner and outer annular portions, respectively according to the present invention.

Although each of the above embodiments is described with an automatic transmission apparatus serving as a power transmission apparatus, the power transmission apparatus may be replaced by an auxiliary transmission apparatus and a transfer apparatus which is used together with the automatic transmission apparatus if the auxiliary transmission apparatus and the transfer apparatus each comprises a plurality of parallel shafts, and a friction engagement element mounted on any one of the of parallel shafts according to the present invention.

Though there has been described in the above embodiments about the return spring used as urging means for restoring the piston to its original position, the piston may be operated to urge the return spring toward the brake engagement state or the clutch engagement state according to the present invention. In this case as shown in FIG. 4, the toothed plate spring is to have a plurality of teeth extending radially outwardly and to be arranged in the oil pressure chamber formed between the piston and the case, and a plurality of protrusions 15g projecting from the piston toward the oil pressure chamber of the annular piston portion to position the return spring in its circumferential direction and to reinforce the annular piston portion.

As will be understood from the previously mentioned description, the friction engagement apparatus according to the present invention is advantageous in that the piston can be restrained from unnecessarily deformed even with the cut-off recession formed in the piston to prevent the piston small in size from interfering with other elements and parts, thereby making it possible to provide a friction engagement apparatus suitable for the power transmission apparatus also small in size. The present invention is useful for the friction engagement apparatus having a piston partly formed with a cut-off recession in the pressure imparting portion of the piston facing the friction plates to restrain the piston from interfering with other elements and parts.

The invention claimed is:

1. A friction engagement apparatus, comprising:
a first friction plate supported on one side of a case;
a rotation element rotatable with respect to the case;
a second friction plate supported on a side of the rotation element opposite to the one side of the case;
an annular piston slidably accommodated in the case and having a pressure receiving portion forming an annular oil pressure chamber together with the case between the case and the pressure receiving portion and a pressure imparting portion imparting pressure to the first and second friction plates in one axial direction with a thrust force from the pressure receiving portion; and
an urging device intervening between the case and the piston and having a resilient member which resiliently urges the piston in the other axial direction opposite to the one axial direction;
the piston having a first pressure receiving section formed by partly cutting off the pressure imparting portion in the circumferential direction and a second pressure receiving section extending in the circumferential direction to exclude the first pressure receiving section;
the resilient member being constituted by an annular plate spring having an annular plate portion coaxially arranged with the annular piston and a plurality of warping arm portions radially extending from the annular plate portion, the annular plate spring having a bending stiffness in the one axial direction per unit of angular range of the annular plate spring, the stiffness in the range of the first pressure receiving section being larger than the stiffness in the range of the second pressure receiving section.

2. The friction engagement apparatus as defined in claim 1 wherein the annular plate portion of the annular plate spring has a first radial width in the range of the first pressure receiving section and a second radial width in the range of the second pressure receiving section, the first radial width being larger than the second radial width.

3. The friction engagement apparatus as defined in claim 1 wherein the warping arm portions of the annular plate spring have a first circumferential width in the range of the first pressure receiving section and a second circumferential width in the range of the second pressure receiving section, the first circumferential width being larger than the second circumferential width.

4. The friction engagement apparatus as defined in claim 1 wherein the piston is constituted by a sheet metal member produced by a press working and a seal member attached to the sheet metal member.

5. The friction engagement apparatus as defined in claim 4 wherein the sheet metal member of the piston has a bottom wall portion serving as the pressure receiving portion and a cylindrical wall portion formed to be bent from the bottom wall portion in the one axial direction, the cylindrical wall portion being cut off in a U-shape from its axial end opposing to the first and second friction plates toward the bottom wall portion to have an axial length in the first pressure receiving section smaller than the axial length in the second pressure receiving section.

6. The friction engagement apparatus as defined in claim 1 wherein the annular plate spring has first and second high stiffness portions respectively formed on the annular plate spring in symmetrical and opposing relationship with each other across the center axis of the annular plate spring, each of the first and second high stiffness portions forming a wide portion to be larger in radial width than a narrow portion formed between the warping arm portions within the range of the second pressure receiving section, or, each of the first and second high stiffness portions forming a wide portion of the annular plate spring to be larger in circumferential width than the warping arm portions formed within the range of the second pressure receiving section.

7. The friction engagement apparatus as defined in claim 6 wherein the first and second high stiffness portions are constituted by a plurality of projections radially outwardly projecting from the annular plate portion of the annular plate spring, and the annular piston has a pair of protrusions radially inwardly protruded to position the annular plate spring in the circumferential direction thereof.

* * * * *